US007984237B2

(12) United States Patent
Rothman et al.

(10) Patent No.: US 7,984,237 B2
(45) Date of Patent: *Jul. 19, 2011

(54) INTEGRATED CIRCUIT CAPABLE OF PRE-FETCHING DATA

(75) Inventors: Michael A. Rothman, Puyallup, WA (US); Vincent Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 840 days.

This patent is subject to a terminal disclaimer.

(21) Appl. No.: 11/846,200

(22) Filed: Aug. 28, 2007

(65) Prior Publication Data

US 2008/0133463 A1  Jun. 5, 2008

Related U.S. Application Data

(63) Continuation of application No. 10/808,182, filed on Mar. 24, 2004, now Pat. No. 7,263,579.

(51) Int. Cl.
  *G06F 12/00* (2006.01)
(52) U.S. Cl. ......... 711/113; 711/100; 711/112; 711/154
(58) Field of Classification Search .................. 711/100, 711/112–113, 154
  See application file for complete search history.

(56) References Cited

U.S. PATENT DOCUMENTS

| 5,146,578 A | 9/1992 | Zangenehpour |
| 5,577,224 A | 11/1996 | DeWitt et al. |
| 6,003,115 A | 12/1999 | Spear et al. |
| 6,085,291 A | 7/2000 | Hicks et al. |
| 6,516,389 B1 | 2/2003 | Uchihori |
| 6,728,840 B1 | 4/2004 | Shatil et al. |
| 7,263,579 B2 | 8/2007 | Rothman et al. |
| 2002/0002568 A1 | 1/2002 | Judson |
| 2002/0002658 A1 | 1/2002 | Okayasu |
| 2002/0152354 A1 | 10/2002 | Harmer |
| 2003/0195940 A1 | 10/2003 | Basu et al. |
| 2004/0117398 A1 | 6/2004 | Idei et al. |
| 2004/0193807 A1 | 9/2004 | Mogi et al. |
| 2005/0216671 A1 | 9/2005 | Rothman et al. |

FOREIGN PATENT DOCUMENTS

| JP | 2001101061 | 4/2001 |
| TW | 371331 | 10/1999 |
| WO | 2005101182 A2 | 10/2005 |
| WO | 2005101182 A3 | 10/2005 |

OTHER PUBLICATIONS

Office Action received for European Patent Application No. 05725511.9, Mailed on Dec. 1, 2009, pp. 3.
Non-Final Office Action received for U.S. Appl. No. 10/808,182, mailed on Jul. 26, 2006, pp. 21.

(Continued)

*Primary Examiner* — Jasmine Song
(74) *Attorney, Agent, or Firm* — Grossman, Tucker, Perreault & Pfleger, PLLC (57) ABSTRACT

A method according to one embodiment may include retrieving selected data from one or more mass storage devices, based at least in part on historical device access information of at least one requester of data. A method according to another embodiment may include retrieving, by an integrated circuit, device data layout information from one or more mass storage devices, and storing, by the integrated circuit, the device data layout information in cache memory. Of course, many alternatives, variations, and modifications are possible without departing from this embodiment.

16 Claims, 5 Drawing Sheets

OTHER PUBLICATIONS

Final Office Action received for U.S. Appl. No. 10/808,182, Mailed on Dec. 18, 2006, pp. 18.

Notice of Allowance received for U.S. Appl. No. 10/808,182, mailed on Apr. 19, 2007, pp. 6.

International Preliminary Report on Patentability for PCT Patent Application Number PCT/US2005/008403, mailed on Oct. 5, 2006, pp. 2.

Office Action received Nov. 20, 2007 for Taiwan Patent Application No. 94107681; 10 pages.

European Office Action for application No. 05725511.9 mailed on Aug. 31, 2007, 5 pgs.

"PCI Express Base Specification Revision 1.0", PCI Express, dated Jul. 22, 2002, 428 pgs (Standard #1).

"PCI-X Addendum to the PCI Local Bus Specification", PCI Special Interest Group: Revision 1.0a, dated Jul. 24, 2000, 240 pgs (Standard # 2).

"American National Standard for Information Technology—Fibre Channel—Physical and Signalling Interface-3 (FC-PH-3)", Developed by incits, Where IT all Begins, dated 1998,116 pgs (Standard #3) .

"Serial ATA: High Speed Serialized AT Attachment, Serial ATA Workgroup", APT Technologies, Inc.: Revision 1.0, dated Aug. 29, 2001, 9 pgs (Standard #4a).

"Working Draft American National Standard, Project T10/1601-D", Information Technology—Serial Attached SCSI-1.1 (SAS-1.1): Revision 1, dated Sep. 18, 2003, 464 pgs (Standard #5).

"Hardware White Paper, Version 1.03", Microsoft Extensible Firmware Initiative FAT32 File System Specification; FAT: General Overview of On-Disk Format, dated Dec. 6, 2000, 1 page (Standard #11).

International Search Report and Written Opinion of the Inernational Searching Authority; Dated Mar. 3, 2006; PCT/US2005/008403, (Mar. 3, 2006),16 pgs.

INTEGRATED CIRCUIT CAPABLE OF PRE-FETCHING DATA

CROSS REFERENCE TO A RELATED APPLICATION

This application is a continuation application of U.S. patent application Ser. No. 10/808,182 filed Mar. 24, 2004, now U.S. Pat. No. 7,263,579, the entire disclosure of which is incorporated herein by reference.

FIELD

The present disclosure relates to an integrated circuit capable of pre-fetching data.

BACKGROUND

In one conventional file system, one or more workstation terminals access data through a host computer system. The data may be stored on one or more disk drives in a storage array, and the host system processes read/write commands from a workstation and accesses an appropriate disk in response to those commands. In a large file sharing system environment, several users may have access to disk data on a single terminal or many terminals supporting many users may be connected to the host system. The host system may include cache memory which can store data from one or more disks. Caching algorithms may be used in conjunction with cache memory in an effort to accurately populate cache memory with likely data that may be accessed on one or more disks by one or more users. However, conventional file systems do not populate cache memory with disk data that reflects actual use and/or user data. Additionally, conventional data read requests require, at minimum, device layout information to be read from the disk and corresponding disk activity to determine the location of the requested data. Therefore, conventional file systems and conventional caching algorithms are incapable of populating cache memory based on historical data access information. Also, conventional file systems and conventional caching algorithms are incapable of caching device layout information so that data location information can be determined with minimal disk activity.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
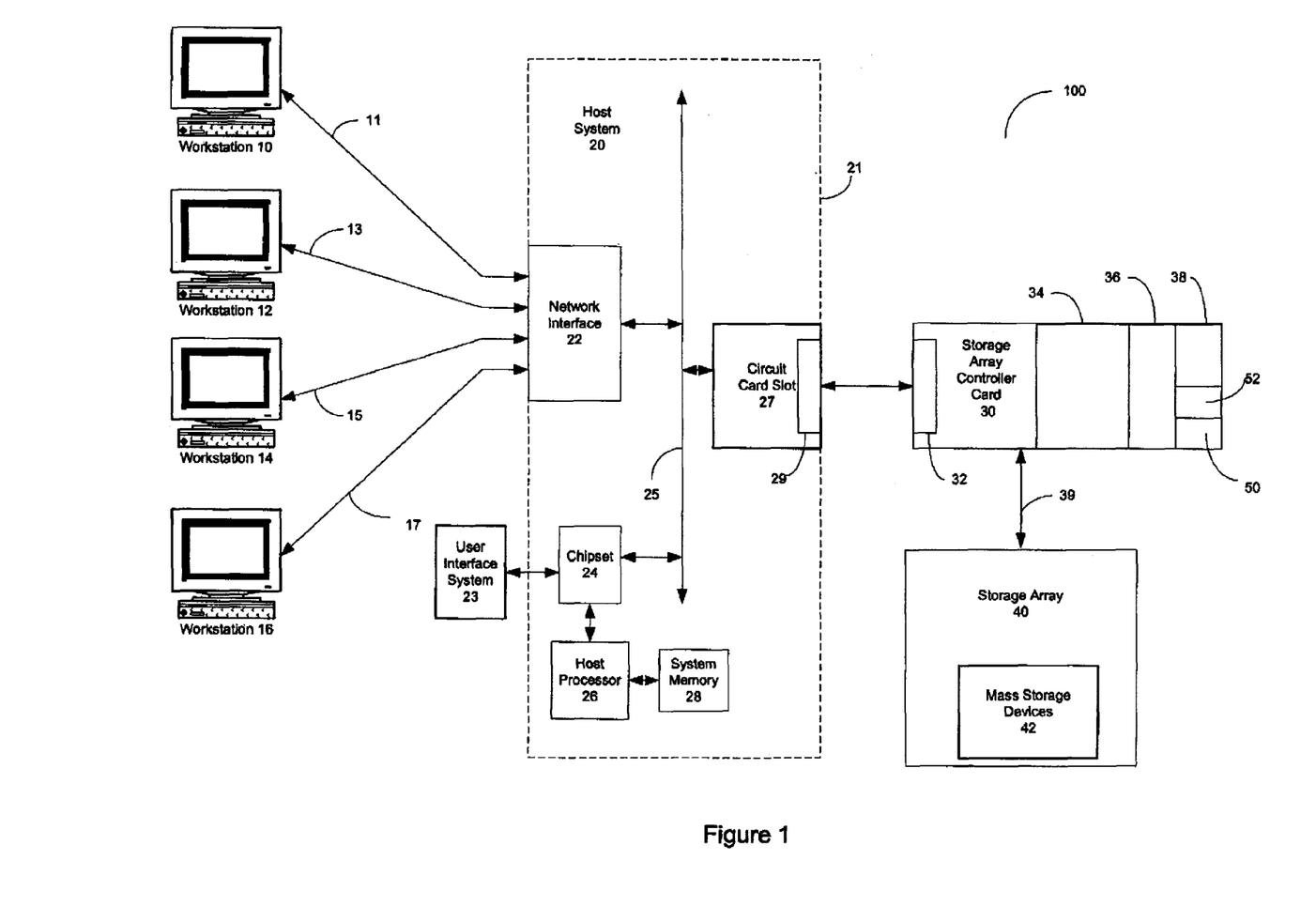
FIG. 1 is a diagram illustrating an exemplary system embodiment.

FIG. 1 illustrates a system embodiment 100 of the claimed subject matter. System 100 may include a plurality of workstation systems 10, 12, 14 and/or 16 capable of exchanging commands and data with a storage array 40 via a host system 20. Host system 20 may comprise a host processor 26 coupled to a chipset 24. Host processor 26 may comprise, for example, an Intel® Pentium® IV microprocessor that is commercially available from the Assignee of the subject application. Of course, alternatively, host processor 26 may comprise another type of microprocessor, such as, for example, a microprocessor that is manufactured and/or commercially available from a source other than the Assignee of the subject application, without departing from this embodiment.

Chipset 24 may comprise a host bridge/hub system that may couple host processor 26, a system memory 28 and a user interface system 23 to each other and to a bus system 25. Chipset 24 may also include an I/O bridge/hub system (not shown) that may couple the host bridge/bus system to bus 25. Chipset 24 may comprise integrated circuit chips, such as those selected from integrated circuit chipsets commercially available from the assignee of the subject application (e.g., graphics memory and I/O controller hub chipsets), although other integrated circuit chips may also, or alternatively be used, without departing from this embodiment. User interface system 23 may comprise, e.g., a keyboard, pointing device, and display system that may permit a human user to input commands to, and monitor the operation of, system 100.

Bus 25 may comprise a bus that complies with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). Alternatively, bus 22 instead may comprise a bus that complies with the PCI-X Specification Rev. 1.0a Jul. 24, 2000, available from the aforesaid PCI Special Interest Group, Portland, Oreg., U.S.A. (hereinafter referred to as a "PCI-X bus"). Also alternatively, bus 25 may comprise other types and configurations of bus systems, without departing from this embodiment. Processor 26, system memory 28, chipset 24, bus 25, and circuit card slot 27 may be comprised in a single circuit board, such as, for example, a system motherboard 21.

In this embodiment, storage array 40 may comprise, e.g., an array of media devices which may comprise one or more mass storage devices 42, for example, a redundant array of inexpensive disks (RAID). Each disk may be accessed independently by controller card 30, and may further be capable of being identified by controller card 30 using, for example, disk identification (disk ID) information. Each disk may store data thereon in selected units, for example, large block address (LBA), sectors, clusters, and/or any combination thereof. Storage array 40 may be comprised in one or more respective enclosures that may be separate from the enclosure in which the motherboard 21 and the components comprised in the motherboard 21 are enclosed.

Storage array controller card 30 (hereinafter "controller card 30") may be coupled to and control the operation of storage array 40. Controller card 30 may be coupled to one or more mass storage devices 42 comprised in storage array 40 via one or more network communication links 39. As is discussed in below, depending at least in part upon the operating mode of an integrated circuit 34 that may be comprised in card 30, card 30 may exchange data and/or commands with mass storage devices 42, via links 39, using one or more of a variety of different communication protocols, e.g., Fibre Channel (FC), Serial Advanced Technology Attachment (SATA), and/or Serial Attached Small Computer Systems Interface (SAS) protocol. Of course, alternatively, controller card 30 may exchange data and/or commands with mass storage devices 42 using other and/or additional communication protocols, without departing from this embodiment.

In accordance with this embodiment, if a FC protocol is used by controller card 30 to exchange data and/or commands with mass storage 42, it may comply or be compatible with the interface/protocol described in ANSI Standard Fibre Channel (FC) Physical and Signaling Interface-3 X3.303: 1998 Specification. Alternatively, if a SATA protocol is used by controller card 30 to exchange data and/or commands with mass storage 42, it may comply or be compatible with the protocol described in "Serial ATA: High Speed Serialized AT Attachment," Revision 1.0, published on Aug. 29, 2001 by the Serial ATA Working Group. Further alternatively, if a SAS protocol is used by controller card 30 to exchange data and/or commands with mass storage 42, it may comply or be compatible with the protocol described in "Information Technology—Serial Attached SCSI (SAS)," Working Draft American National Standard of International Committee For Information Technology Standards (INCITS) T10 Technical Committee, Project T10/1562-D, Revision 2b, published 19 Oct. 2002, by American National Standards Institute (hereinafter termed the "SAS Standard") and/or later-published versions of the SAS Standard.

Depending upon, for example, whether bus 25 comprises a PCI Express™ bus or a PCI-X bus, circuit card slot 27 may comprise, for example, a PCI Express™ or PCI-X bus compatible or compliant expansion slot or interface 29. Interface 29 may comprise a bus connector (not shown) which may be electrically and mechanically mated with a mating bus connector 32 that may be comprised in a bus expansion slot or interface (not shown) in controller card 30.

Slot 27 and card 30 are constructed to permit card 30 to be inserted into slot 27. When card 30 is properly inserted into slot 27, connectors 29 and 32 become electrically and mechanically coupled to each other. When connectors 29 and 32 are so coupled to each other, card 30 becomes electrically coupled to bus 25 and may exchange data and/or commands with system memory 28, host processor 26, user interface system 23 via bus 25 and chipset 24, and/or one or more workstations 10, 12, 14 and/or 16 via bus 25 and network interface 22.

Alternatively, without departing from this embodiment, the operative circuitry of card 30 may not be comprised in card 30, but instead, may be comprised in other structures, systems, and/or devices. These other structures, systems, and/or devices may be, for example, comprised in motherboard 21, coupled to bus 25, and exchange data and/or commands with other components (such as, for example, system memory 28, host processor 26, and/or user interface system 23) in system 100.

Circuit card 30 may comprise an integrated circuit 34, computer-readable boot code memory 36, and computer-readable memory 38. As used herein, an "integrated circuit" means a semiconductor device and/or microelectronic device, such as, for example, a semiconductor integrated circuit chip. Memories 36 and/or 38 each may comprise one or more of the following types of memories: semiconductor firmware memory, programmable memory, non-volatile memory, read only memory, electrically programmable memory, random access memory, flash memory, magnetic disk memory, and/or optical disk memory. Either additionally or alternatively, memories 36 and/or 38 each may comprise other and/or later-developed types of computer-readable memory.

Machine-readable firmware program instructions may be stored in memory 38. As described below, these instructions may be accessed and executed by integrated circuit 34. When executed by integrated circuit 34, these instructions may result in integrated circuit 34 performing the operations described herein as being performed by integrated circuit 34.

In one embodiment, integrated circuit 34 may be capable of controlling data read and/or write operations for one or more mass storage devices 42 comprised in storage array 40. Depending on how the media of each of the mass storage devices 42 is formatted, integrated circuit 34 may be capable of controlling read and/or write operations to access disk data in a large block address (LBA) format, i.e., where data is read from the device in preselected large block units. Of course, other operations to access disk data stored on one or more mass storage devices 42 are equally contemplated herein and may comprise, for example, accessing data by cluster, by sector, by byte, and/or other unit measures of data.

Mass storage devices 42 may be formatted using one or more of a plurality of file system types. For example, one or more mass storage devices 42 may be formatted using a File Allocation Table (FAT) format, New Technology File System (NTFS) format, and/or other disk formats. If a mass storage device is formatted using a FAT format, such a format may comply or be compatible with a formatting standard described in "Microsoft Extensible Firmware Initiative FAT32 File System Specification", Revision 1.3, published Dec. 6, 2000 by Microsoft Corporation. Alternatively, if a mass storage device is formatted using an NTFS format, such a format may comply or be compatible with an NTFS formatting standard, such as may be publicly available.

Workstations 10, 12, 14, and/or 16 (referred to in any embodiment herein collectively as "workstations" or singly as "workstation") may each comprise a stand-alone computer system, and each may be capable of exchanging commands and data with one or more storage devices 42 comprised in the storage array 40 (via host system 20 and controller card 30). To that end, each workstation may include hardware and/or software to permit communication to one or more mass storage devices 42. For example, one or more workstations may include appropriate network communication circuitry (not shown) which may be capable of communicating with network interface 22 to permit, for example, workstations to retrieve and send data to one or more mass storage devices 42. In operation, when one or more workstations request a data read and/or write to one or mass storage devices 42, integrated circuit 34 may be capable of controlling one or more mass storage devices to read or write the requested data from one or more workstations. Communication links 11, 13, 15, and/or 17 may be used to couple respective workstations to a network interface 22 comprised in host system 20. System 100 may form part of a network environment in which a plurality of workstations access data stored on storage array 40, via host system 20. Each workstation may comprise a unique node in the network environment. Such a network environment may comprise, for example, a local area network (LAN), wide area network (WAN), storage area network (SAN), or other network environments, and may further comprise alternatively or additionally one or more wireless network nodes.

Integrated circuit 34 may be capable of receiving one or more data requests from one or more workstations, users of workstations or nodes. "Requester", as used in any embodiment herein, may mean a node and/or a workstation and/or a user of a workstation requesting data from one or more storage devices 42 comprised in the storage array 40. Each node may be capable of generating requester data, for example, when a workstation (or user of a workstation) generates a data read request to one or more devices 42 comprised in the storage array 40. "Requester data", as used in any embodiment herein, may mean a sequence of symbols which may comprise identification data identifying a workstation or user of a user of a workstation. Requester data may comprise, for example, a media access control (MAC) address, which may comprise a hardware address that uniquely identifies a workstation and/or a node of a network, in which case the requester may be identified as a MAC address. A network card (not shown) comprised in a workstation may be capable of generating a MAC address. Alternatively, or in addition to a MAC address, requester data may comprise processor identification data, such as may be generated by a system processor (e.g., Intel® Pentium® IV microprocessor which may be comprised in a workstation), in which case the requester may be identified as a processor. Alternatively, or additionally, requester data may comprise user identification data, which may comprise operating system logon data and/or other data capable of identifying a user of a workstation, in which case the requester is a user of a workstation. Of course, these are only exemplary types of requester data, and it is intended in the present embodiment that additional and/or alternative requester identifying data shall be considered equivalent.

In at least one embodiment described herein, profile data 50 may be created and stored in memory 38. "Profile data", as defined in any embodiment herein, may comprise one or more requester profiles. A "requester profile" may be defined as a relationship between a requester and device access information for that requester. "Device access information", as defined in any embodiment herein, may comprise device identification data (e.g., Disk ID) and historical device access data for data on one or more devices 42 comprised in storage array 40. Historical device access data may comprise historical data read requests for a requester, and may comprise, for example historical LBA information for data requested on one or more storage devices 42. For example, profile data may relate a particular requester with historical LBA data accessed by the requester. In an exemplary embodiment, integrated circuit 34 may be capable of monitoring data read requests as may be generated by one or more requesters. Integrated circuit 34 also may be capable of creating profile data 50 by relating requester data with device usage data. Such profile data 50 may be stored in memory 38. Of course, profile data 50 may comprise multiple requester profiles.

Figure 2:
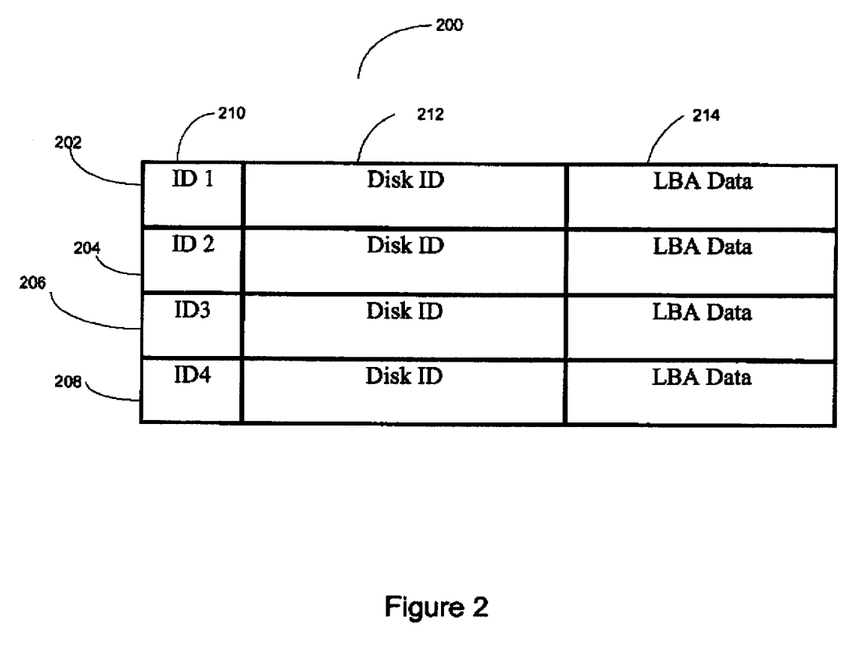
FIG. 2 is table illustrating exemplary profile data.

FIG. 2 depicts an exemplary table 200 of profile data 50. A plurality of requester profiles are depicted in table 200, where each profile is represented by a row 202, 204, 206 and 208 in table 200. The first column 210 of table 200 may represent unique requesters, and columns 212 and 214 may represent disk ID data and device usage data (e.g. LBA data), respectively. Thus, in table 200, Requester 1 may be related to the disk drive ID and historical LBA data contained within that row (i.e., row 202). Disk ID and LBA data for each respective requester entry (e.g., Requester 1, Requester 2, Requester 3, Requester 4) may represent historical data read requests generated by a respective Requester. For example, the disk ID and LBA data entries may comprise a selected number of previous data read request associated with a respective workstation or user of a workstation (i.e., identification data). Of course, table 200 represents only four profiles but it should be understood that any number of profiles may be created and stored in table 200. Also, table 200 shall be construed only as a representative format for organizing profile data as a collection of individual profiles, where each individual profile relates identification data and device usage data.

Memory 36 may comprise cache memory, and integrated circuit 34 may be capable of reading data from one or more mass storage devices 42 and storing the data in memory 36. Executable instructions, such as caching instructions 52, may be stored in memory 38, and executed by integrated circuit 34. Caching instructions 52, when executed by integrated circuit 34, may cause integrated circuit 34 to read selected data from one or more devices 42 and store the data in cache memory 36. In accordance with at least one embodiment described herein, caching instructions 52 may call profile data 50 to transfer data from one or more mass storage devices into cache memory 36 based on, at least in part, historical device access data related to at least one requester comprised in the profile data 50.

Integrated circuit 34 may be capable of executing caching instructions 52 based on profile data 50 to populate cache memory 36 with selected data from one or more mass storage devices 42 comprised in storage array 40. In one embodiment, caching instructions may be executed, for example, when integrated circuit 34 is initialized, booted or reset, and/or at other preselected times. When a data read request is transmitted by one or more workstations, integrated circuit 34 may determine, at least in part, if the transmitted requester data matches requester data comprised in one or more profiles. If a match exits, integrated circuit 34 may determine, at least in part, if data called for in the data read request is stored in cache memory 36. If such data exists in cache memory 36, integrated circuit 34 may read the data directly from cache memory 36 and transmit the data to the requester from cache memory 36.

As set forth above, device usage data may comprise historical data access information for a given requester. This may comprise, for example, historical LBA data of one or more data requests for data contained on one or more devices 42. Alternatively or additionally, historical data access information may comprise only data that has been accessed a selected number of times over a selected time period. Alternatively or additionally, historical data access information may comprise heuristic properties of a defined set of data requests. To that end, integrated circuit 34 may be capable of applying statistical learning algorithms (e.g., Bayesian algorithms) and/or other mathematical algorithms to define the historical data access information comprised in a given profile. Caching instructions 52 may also cause integrated circuit 34 to update profile data 50 with new data access requests for given identification data. In this manner, changing data access patterns may be reflected in the requester profile to more accurately identify potential data which can be stored in cache memory 36.

Figure 3:
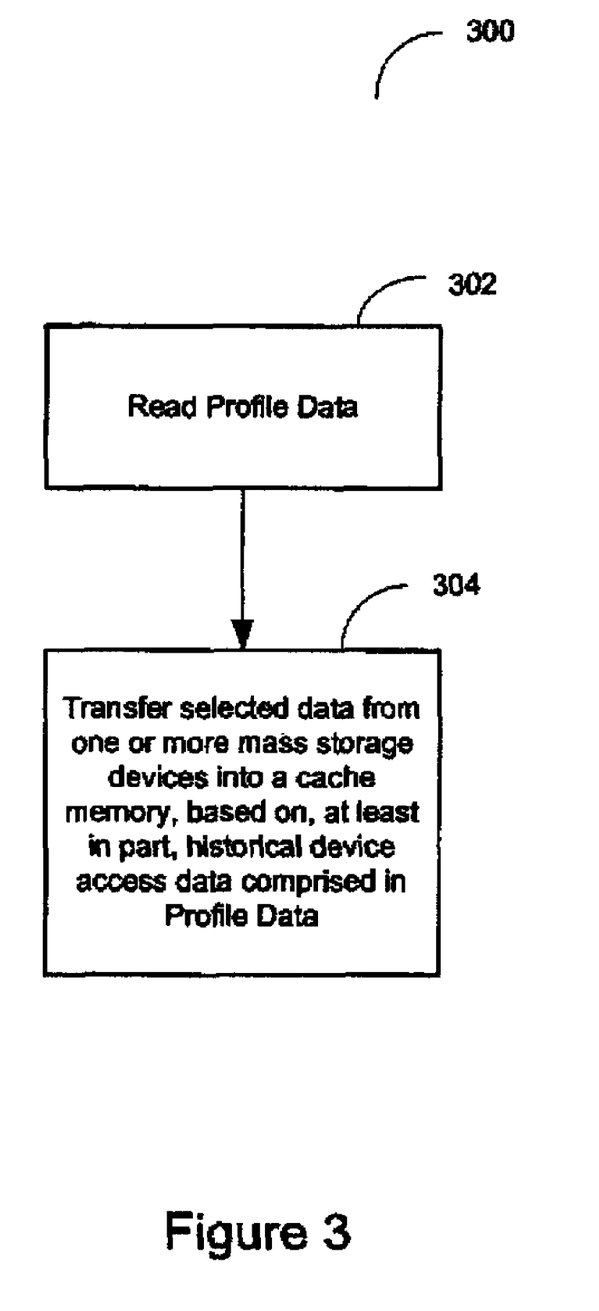
FIG. 3 is a flowchart illustrating exemplary operations that may be performed according to an embodiment.

FIG. 3 depicts a flowchart 300 of exemplary operations which may be performed according to an embodiment. Operations may be performed by integrated circuit 34, and may include reading profile data 302. This operation may be performed, for example, when integrated circuit 34 is initialized, booted and/or reset. Alternatively, this operation may be performed, for example, when integrated circuit 34 receives a data read request from one or more requesters. Operations may further include transferring selected data from one or more mass storage devices into cache memory, based on, at least in part, historical device access data comprised in the profile data 304.

Figure 4:
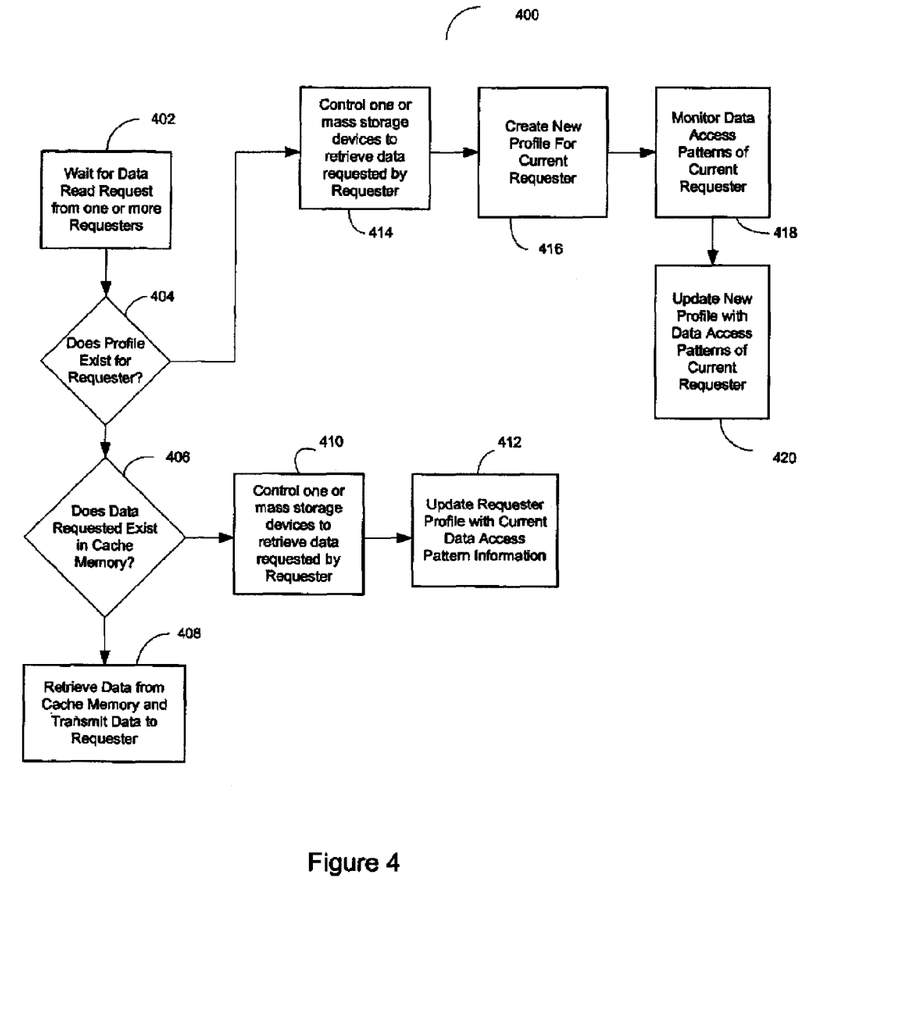
FIG. 4 is another flowchart illustrating exemplary operations that may be performed according to an embodiment.

FIG. 4 depicts another flowchart 400 of exemplary operations which may be performed according to an embodiment. Operations may be performed by integrated circuit 34, and may include waiting for one or more data read requests from one or more requesters 402. If a request for data is received, operations may also include determining if a profile exists for the requester 404. This operation may be performed by reading profile data and determining if the requester has an existing profile contained in the profile data. If a profile exists for the current requester, operations may also include determining if the data requested exists in cache memory 406. If the data exists in cache memory, operations may include retrieving the data from cache memory and transmitting the data to the requester 408. If the data is not in cache memory, operations may include controlling one or more mass storage devices to retrieve the data requested by the requester 410. Consistent with at least one embodiment herein, operations may additionally include updating the requester profile with the current data access pattern information 412. This operation may be useful, for example, in future data read requests from a given requester.

If a profile does not exist for a given requester, operations may include controlling one or more mass storage devices to retrieve data requested by the requester 414. In one embodiment, a new profile may be created for the current requester 416. To that end, operations may include monitoring data access patterns of the current requester 418, and updating the new profile with data access patterns of the current requester 420.

One apparatus embodiment may include an integrated circuit is capable of retrieving selected data from one or more mass storage devices, based at least in part on historical device access information of at least one requester of data.

Operations according to at least one embodiment described herein may populate cache memory based on historical device access information, which may increase the likelihood of data requests existing in cache memory (i.e., increasing the likelihood of cache memory "hits"). Thus, advantageously, theses operations may be capable of minimizing or reducing disk activity (i.e. disk "spin up" and disk head movement) by tracking data access requests and using this information to populate cache memory. Further, such operations as set forth herein may increase data throughput and improve data access efficiency by permitting, for example, data to be read directly from cache memory instead of reading data from the disk.

In another exemplary embodiment described herein, and again referring to FIG. 1, the storage array controller card 30 may be capable of caching device data layout information comprised in one or more storage devices 42. "Device data layout information", as defined herein, may comprise file system type data of one or more devices. As described previously herein, mass storage devices 42 may be formatted using one or more file system types, for example a FAT file system or a NTFS file system. As an example, in a FAT file system, each device 42 may include a FAT which may describe the data layout on the device. When a data read request is received by the controller card 30, certain predefined disk access operations may be performed according to the FAT standard.

For example, according to the FAT standard, typical file access operations may include reading of a file allocation table (FAT) from one or more devices 42 in the storage array 40 to determine the location (or locations) of the root directory for the file (or files) requested. The root directory may be read to determine the cluster associated with a subdirectory. Since directories often carry more than a cluster's worth of data, the FAT may be further read to determine any continuation locations of the subdirectory. The continuation locations of the subdirectory may be read and a query operation may be performed to find the data clusters of the requested file. The FAT chain may be read, since a file may often span many data clusters. Finally, the clusters associated with the FAT chain of the requested file may be read.

In this embodiment, caching instructions 52 may alternatively or additionally comprise hardware readable firmware instructions that may cause integrated circuit 34 to be capable reading the FAT of one or more devices 42 in the storage array 40, and storing the FAT in cache memory 36. Integrated circuit 34 may also be capable of performing selected file access operations, such as those described above, directly in memory 36, without requiring disk access until the clusters associated with the FAT chain of the requested file are determined, and read from one or more devices 42. Further, with the FAT stored in memory 36, at least one read operations in one or more devices 42 may be avoided.

Figure 5:
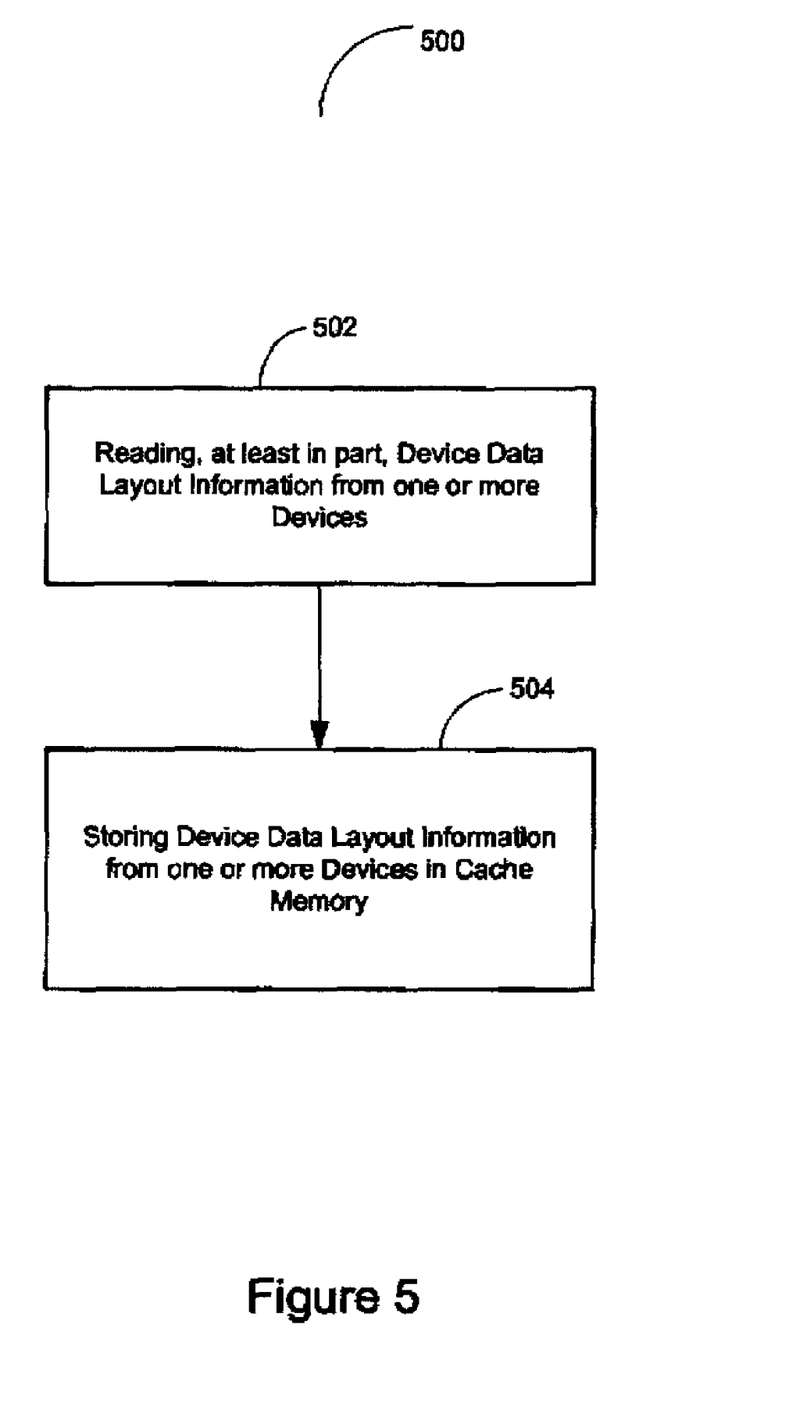
FIG. 5 is another flowchart illustrating exemplary operations which may be performed according to an embodiment.

FIG. 5 depicts a flowchart 500 of exemplary operations according to one embodiment. Operations may be performed by integrated circuit 34 which may include reading, at least in part, device data layout information from one or more devices in a storage array 502. Operations may also include storing device data layout information from one or more devices in cache memory 504. Although not shown in the drawings, in operation, if a data request is received, operations may further include determining, at least in part, at least one target device corresponding to the data request, and further determining, at least in part, if the FAT for the target device is available in cache memory. If the FAT for the target device is available in cache memory, operations may further include performing file access operations using the FAT stored in memory. Operations may further include reading from one or more devices the clusters associated with the FAT chain of the requested file, and transmitting the requested data to the requester.

Thus, in this embodiment, selected file access operations may be performed on a copy of a FAT stored in cache memory 36. In one embodiment, device data layout information (e.g., FAT, NTFS, etc.) may be copied into memory 36 when integrated circuit 34 is initialized, reset and/or booted. Alternatively or additionally, device data layout information may be may be copied from one or more devices 42 at other times, for example, when a data read request is received from one or more workstations. Additionally or alternatively, integrated circuit 34 may be capable of determining if the device data layout information of a particular device has changed (for example when data is written to the device), and such an event may cause integrated circuit 34 to copy an updated version of the FAT from that device into memory 36. Further, caching instructions 52 may comprise instructions so that a FAT copy is transferred only from selected devices among the plurality of available devices 42, for example, to reduce the amount of cache memory necessary. To that end, integrated circuit 34 may be capable of monitoring overall device access to determine which device or devices, among the plurality of available devices 42, is most active over a selected period of time. Additional operations may include, for example, determining if the requested file is in cache memory, as set in the description herein.

A method according to one embodiment includes retrieving device data layout information from one or more mass storage devices, and storing the device data layout information in cache memory.

Operations according to at least one embodiment described herein may populate cache memory with device data layout information for at least one target device. Thus, selected device access operations to locate a requested file may be performed directly in memory without having to access the disk. Such operations may increase data throughput in the system, and may further operate to reduce file access times by performing some disk access tasks in memory.

Although embodiments have been described herein with reference to operations performed by integrated circuit 34, such operations may be performed by other circuitry and/or machines, for example, integrated circuits (not shown) comprised in controller card 30 and or host system 20. Thus, for example, the operations described herein may be performed by host processor 26 and/or chipset 24. Further, any of the operations described herein may be applied to multiple data read instructions from one or more one or more workstations (and/or users of a workstation).

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method, comprising:
creating a table of profile data, said table comprising a plurality of requester profiles corresponding to a plurality of requesters of data, each said requester profile defining a relationship between a requester and historical device access information;
storing, in a cache memory, data corresponding to said historical device access information for a plurality of said requesters;
retrieving device data layout information from one or more mass storage devices and storing said device data layout information in said cache memory;
receiving a data read request for said data from one or more requesters and determining if said data read request matches said historical device access information; and
responding to said data read request by determining the location of said data on said one or more mass storage devices by performing selected disk access operations on said data layout information in said cache memory.

2. The method of claim 1, further comprising:
retrieving, from said cache memory and in response to said data read request from one or more requesters, said data corresponding to said historical device access information; and
sending said data to said one or more requesters.

3. The method of claim 1, wherein:
said historical device access information comprises, at least in part, device identification information of one or more mass storage devices.

4. The method of claim 1, wherein:
said historical device access information comprises at least in part, historical large block address (LBA) data generated by one or more data requests from said requester of data.

5. The method of claim 1, further comprising:
updating said profile with additional device access information.

6. The method of claim 1, wherein:
said requester of data comprises information selected from a media access control (MAC) address, processor identification and user information.

7. The method of claim 1, wherein:
said device data layout information comprises a file system type selected from a file allocation (FAT) file system and a new technology file system (NTFS) type.

8. An apparatus, comprising:
logic configured to:
create a table of profile data, said table comprising a plurality of requester profiles corresponding to a plurality of requesters of data, each said requester profile defining a relationship between a requester and historical device access information;
store, in a cache memory, data corresponding to said historical device access information for a plurality of said requesters;
retrieve device data layout information from one or more mass storage devices and storing said device data layout information in said cache memory;
receive a data read request for said data from one or more requesters and determining if said data read request matches said historical device access information; and
respond to said data read request by determining the location of said data on said one or more mass storage devices by performing selected disk access operations on said data layout information in said cache memory.

9. The apparatus of claim 8, wherein:
said logic is further configured to retrieve, from said cache memory and in response to said data read request from one or more requesters, said data corresponding to said historical device access information; and send said data to said one or more requesters.

10. The apparatus of claim 8, wherein:
said historical device access information comprises at least in part, historical large block address (LBA) data generated by one or more data requests from said requester of data.

11. The apparatus of claim 8, wherein:
said logic is further configured to update said requester profile with additional device access information from one or more said requesters of data.

12. The apparatus of claim 8, wherein:
said requester of data comprises information selected from a media access control (MAC) address, processor identification and user information.

13. The apparatus of claim 8, wherein:
said device data layout information comprises a file system type selected from a file allocation (FAT) file system and a new technology file system (NTFS) type.

14. An article, comprising:
a storage medium having stored thereon instructions that when executed by a machine result in the following:
creating a table of profile data, said table comprising a plurality of requester profiles corresponding to a plurality of requesters of data, each said requester profile defining a relationship between a requester and historical device access information;
storing, in a cache memory, data corresponding to said historical device access information for a plurality of said requesters;
retrieving device data layout information from one or more mass storage devices and storing said device data layout information in cache memory;
receiving a data read request for said data from one or more requesters and determining if said data read request matches said historical device access information; and
responding to said data read request by determining the location of said data on said one or more mass storage devices by performing selected disk access operations on said data layout information in said cache memory.

15. The article of claim 14, further comprising instructions that when executed by said machine result in the following additional operations:
retrieving, from said cache memory and in response to said data read request from one or more requesters, said data corresponding to said historical device access information; and sending said data to said one or more requesters.

16. The article of claim 14, further comprising instructions that when executed by said machine result in the following additional operations:

updating said profile with additional device access information.

* * * * *